3,745,127
COMPOSITION OF MATTER CONTAINING CARBON

William J. Asher, Fanwood, N.J., assignor to the United States of America as represented by the Secretary of the Army
No Drawing. Filed Mar. 20, 1972, Ser. No. 236,170
Int. Cl. B01j 11/06
U.S. Cl. 252—446　　　　　　　　　　　　　　3 Claims

ABSTRACT OF THE DISCLOSURE

A new composition of matter has been made. It consists of porous carbon with a very thin layer of alumino silicate on the pore walls. The alumino silicate contains exchangeable sodium+ cations. Ion exchange can be used to change adsorption properties or load catalyst elements. These materials can be used for fuel cell electrodes, adsorbents or catalyst supports.

This invention relates to a new composition of matter suitable for use as the fuel electrode of a hydrocarbon-air fuel cell, as an adsorbent, and as a support for catalysts.

BACKGROUND OF THE INVENTION

The hydrocarbon-air fuel cell is known in the art. Such fuel cells have been characterized by an insufficient utilization of noble metal as for example, platinum at the fuel electrode. By this is meant that there is not a sufficient electrical output for the amount of platinum used.

SUMMARY OF THE INVENTION

The general object of this invention is to provide a new composition of matter for the fuel cell electrode of a hydrocarbon-air fuel cell in which improved platinum utilization is obtained. A further object of the invention is to provide a high surface area base support onto which a catalyst such as platinum can be deposited.

According to the invention, a new composition of matter is provided. It is an alumino silicate on porous carbon. The alumino silicate exists as a layer tetrahedra of aluminum and silicon atoms each surrounded by four oxygen atoms. This layer is deposited on the walls of the pores of the carbon particles. The alumino silicate layer has ion exchange properties similar to those of molecular sieve. These properties result from a Na+ cation being held with the aluminum tetrahedra for electrical neutrality as they are in molecular sieves. The Na+ ion is then exchanged for the catalytic element prior to reduction. This insures the presence of discrete individual platinum ions or other catalytic metal ions prior to the reduction step, which minimizes platinum crystallite size or other catalytic metal crystallite size.

BRIEF DESCRIPTION OF THE PREFERRED EMBODIMENT

The deposition of alumina silicates on carbon proceeds with surprising ease. That is, the carbon particles are put in an aqueous solution of sodium silicate, sodium hydroxide and sodium aluminate similar to those used to grow crystals of molecular sieve.

EXAMPLE I 0.9985 gram of carbon are put into an aqueous solution of 0.256 gram of sodium silicate and 0.108 gram of sodium hydroxide in 110 milliliters of water. To this slurry is added a solution of 0.1 gram of sodium aluminate in 110 milliliters of water. The slurry is then stirred at a temperature of 25 degrees C. for 20 minutes, filtered, and the solid wet residue washed with water. 0.9514 gram of alumino silicate on carbon is recovered.

EXAMPLE II 5.0061 grams of carbon is put into an aqueous solution of 2.56 grams of sodium silicate and 1.08 grams of sodium hydroxide in 55 milliliters of water. To this slurry is added a solution of 1.0 gram sodium aluminate in 55 milliliters of water. The slurry is then stirred at a temperature of 25 degrees C. for 20 minutes, filtered, and the solid wet residue washed with water. 6.2328 grams of alumino silicate on carbon is recovered.

Deposits of up to 140 weight percent are readily formed. A deposit of 70 weight percent represents a monolayer of the alumino silicate tetrahedra, which consists of aluminum or silicon surrounded by four oxygen atoms, evenly spread over the surface area of the carbon. Deposits of from 0.5 to 140 weight percent can be made by changing the ratios of salts to carbon and water to carbon.

The alumino-silicate deposits appear to have all four characteristics required of an effective co-support. Microscopic examination indicates that all of the alumino-silicate is on the carbon particles rather than in separate aggregates. This is important since any catalyst deposited on alumino-silicate agglomerates would not be in good electrical contact and could not contribute to the electrochemical reaction. Conductivity tests indicate that the alumino-silicate deposit is inside the catalyst pores. The conductivity of a 25 percent alumino-silicate on carbon is two-thirds that of the pure carbon. Had surface multilayer deposition occurred on the outside of the particles, much lower conductivity would have been observed.

The absence of this thick multilayer is important to both the charge transfer from the catalyst on alumino-silicate to the conductive carbon co-support and the conduction of these electrons through the carbon co-support to the electrode current collector.

Furthermore, large crystal deposits are not formed in a few pores as the X-ray scans indicate that the deposits are amorphous. If large crystals had been formed in the pores, the electrical conductivity from the catalyst in the crystals to the carbon would have been a problem.

This deposition of alumino-silicate on the carbon surfaces in the pores appears general. Both carbons which have essentially nonoxidized surfaces and carbons which have been treated with carbon dioxide at elevated temperature to oxidize the surface have been used. Both types of carbons gave similar results.

Finally, exchangeable Na+ ions are found. That is, powders formed are first contacted with water and then calcium chloride solutions. The solution from the water contacting step shows no sodium in the flame test but the solution from the calcium chloride treatment does show Na+ indicating that ion exchange has occurred. Thus, all four of the characteristics required for effective catalyst utilization have been met.

While there has been described what is at present considered to be the preferred embodiment of this invention, it will be obvious to those skilled in the art that various changes and modifications may be made therein without departing from the invention.

What is claimed is:

1. As a new composition of matter, porous carbon with a very thin layer of alumino-silicate on the pore walls, the alumino silicate containing exchangeable sodium+ cations.

2. As a new composition of matter, porous carbon with an 0.5 to 140 weight percent deposit of alumino silicate on the pore walls, the alumino silicate containing exchangeable sodium+ cations.

3. As a new composition of matter, porous carbon with a monolayer of alumino silicate on the pore walls, the alumino silicate containing exchangeable sodium+ cations.

References Cited

UNITED STATES PATENTS

| | | | |
|---|---|---|---|
| 1,610,408 | 12/1926 | Alexander | 252—446 X |
| 1,917,689 | 7/1933 | Baum | 252—446 X |
| 2,991,201 | 7/1961 | Joyce | 252—446 X |

FOREIGN PATENTS

| | | | |
|---|---|---|---|
| 247,241 | 2/1926 | Great Britain | 252—446 |

PATRICK P. GARVIN, Primary Examiner

U.S. Cl. X.R.

136—120 FC, 121